July 14, 1925.
W. SCHAAKE
1,545,699
CURRENT COLLECTOR FOR VEHICLES
Filed Nov. 2, 1921
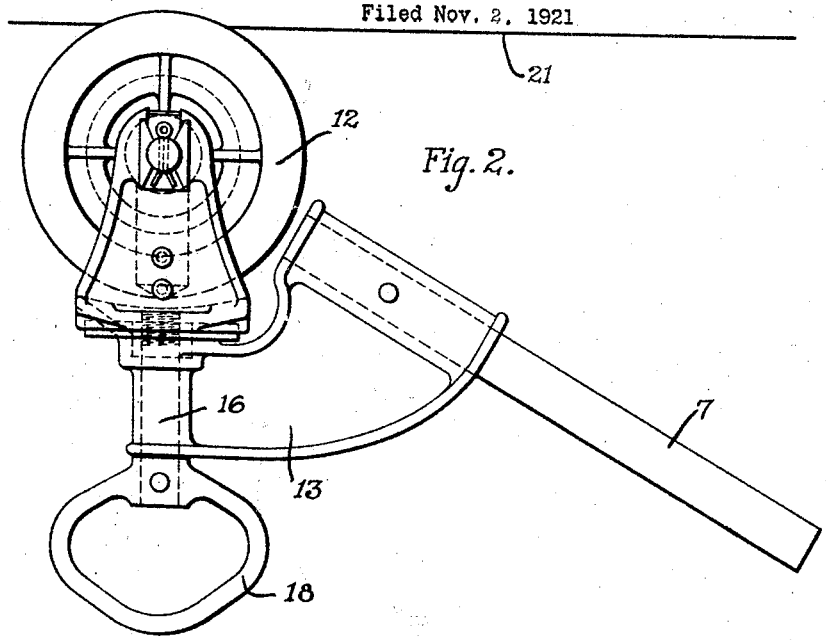
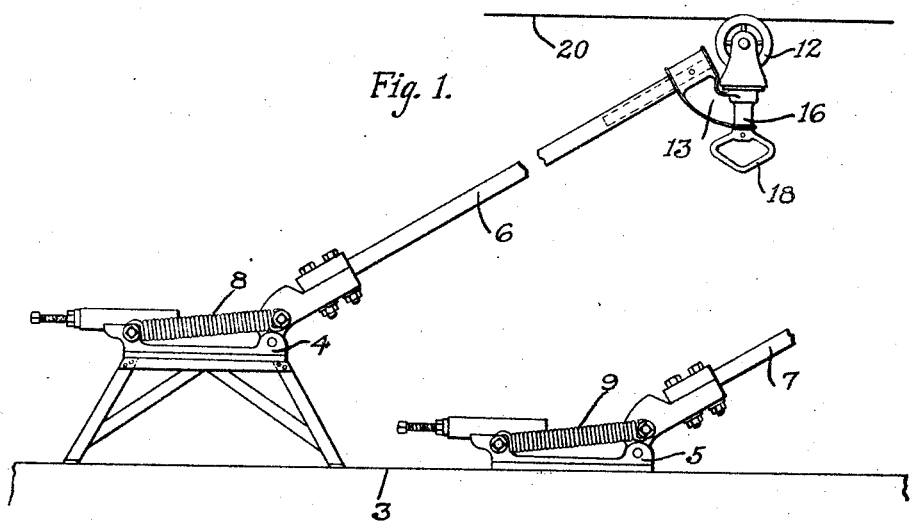
WITNESSES:
INVENTOR
William Schaake.
BY
ATTORNEY Patented July 14, 1925.

1,545,699

UNITED STATES PATENT OFFICE.

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA.

CURRENT COLLECTOR FOR VEHICLES.

Application filed November 2, 1921. Serial No. 512,221.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Current Collectors for Vehicles, of which the following is a specification.

My invention relates to current collectors for vehicles and particularly to the manner in which a plurality of collectors are mounted upon a single vehicle.

My invention is directed more particularly to those vehicles, such as trackless trolleys, wherein a plurality of collectors are employed, and it has for its object the provision of means whereby two or more collectors may be mounted upon a single vehicle in such manner that they may be manipulated with a minimum amount of interference the one with the other.

As shown in the accompanying drawing, Figure 1 is a view, in side elevation, of a pair of trolley poles mounted upon a vehicle roof, and Fig. 2 is a detail view of the means by which the trolley wheels are mounted upon their respective poles.

A portion of the roof 3 of a trolley bus (not shown) has mounted thereon two swivelling bases 4 and 5 to which are pivotally secured poles 6 and 7, respectively, the poles being normally biased upwardly by the springs 8 and 9, respectively, in the usual manner. Since the bases 4 and 5 may be of any standard type, no detailed description thereof is necessary.

The base 4 is mounted upon a pedestal, preferably over the longitudinal center line of the vehicle and somewhat in advance of the base 5, which is also mounted over the longitudinal center line of the vehicle.

Each of the poles 6 and 7 carries, at its upper end, a trolley wheel 12 that is mounted for swivelling movement in a bracket 13. The swivel mounting includes a shaft 16 that extends through the bracket 13 and is provided, at its lower end, with an eye portion 18 for the reception of a hook or rope (not shown) by which the current collectors and the trolley poles may be manipulated in the usual manner.

The wheel carried by the pole 6 co-operates with the trolley wire 20, and the wheel carried by the pole 7 co-operates with a trolley wire 21, the wires 20 and 21 being located substantially in the same horizontal plane and spaced a slight distance apart.

The poles 6 and 7 are preferably of substantially the same length and the end of the pole 7 is, therefore, at some distance to the rear of the pole 6.

The advantage in having the pole 6 mounted on a base located in a higher plane than the base of the pole 7 and in having the current collectors of the respective poles in longitudinal spaced relation resides in the fact that, when it is desired to turn the bus, as at the end of the trolley line, the poles may be manipulated with less danger of interference therebetween, particularly if the operator turns them simultaneously. Furthermore, there is less danger of interference between extended portions of the bases.

Various modifications will readily occur to those familiar with the art.

I claim as my invention:

1. The combination with an electrically driven vehicle, of a pair of trolley poles mounted thereupon, each provided with a swivel base, one of the bases being located forwardly of, and in a higher horizontal plane than, the other base and a current collector on each of said poles.

2. The combination with an electrically driven vehicle, of a pair of trolley poles therefor of substantially equal length and each provided with a swivel base, one of the bases being located forwardly of, and in a higher horizontal plane than, the other base and a current collector on each of said poles.

3. The combination with an electrically driven vehicle, of a pair of trolley poles therefor, each provided with a swivel base that is located over the longitudinal center line of the vehicle, one of the bases being located forwardly of, and in a higher horizontal plane than, the other base and a current collector on each of said poles.

4. The combination with an electrically driven vehicle, of a pair of trolley poles therefor each provided with a swivel base that is mounted upon an independent support on the vehicle, one of the bases being mounted in a different horizontal plane than the other and a current collector on each of said poles.

5. The combination with an electrically driven vehicle, of a pair of trolley poles therefor each provided with a swivel base that is mounted upon an independent support on the vehicle, one of the bases being mounted in a different horizontal plane than the other but in the same vertical plane, longitudinally of the vehicle and a current collector on each of said poles.

In testimony whereof, I have hereunto subscribed my name this 26th day of October 1921.

WILLIAM SCHAAKE.